(12) United States Patent
Ragan

(10) Patent No.: US 8,990,737 B2
(45) Date of Patent: Mar. 24, 2015

(54) IMAGE PREVIEW

(75) Inventor: Gene Z. Ragan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 499 days.

(21) Appl. No.: 13/351,894

(22) Filed: Jan. 17, 2012

(65) Prior Publication Data

US 2012/0117468 A1     May 10, 2012

Related U.S. Application Data

(63) Continuation of application No. 11/121,490, filed on May 3, 2005, now Pat. No. 8,117,548.

(51) Int. Cl.
| | |
|---|---|
| G06F 3/048 | (2013.01) |
| G06F 3/00 | (2006.01) |
| G06F 3/0481 | (2013.01) |
| G06F 3/0482 | (2013.01) |
| G06F 17/30 | (2006.01) |

(52) U.S. Cl.
CPC .......... *G06F 3/04817* (2013.01); *G06F 3/0482* (2013.01); *G06F 17/30112* (2013.01)
USPC ............................ 715/856; 715/746; 715/810

(58) Field of Classification Search
CPC .............. G06F 3/04817; G06F 3/0482; G06F 17/30112
USPC ......................................... 715/856, 746, 810
See application file for complete search history.

(56) References Cited

U.S. PATENT DOCUMENTS

| | | | | |
|---|---|---|---|---|
| 5,564,004 | A | 10/1996 | Grossman et al. | 395/159 |
| 6,169,538 | B1 | 1/2001 | Nowlan et al. | 345/168 |
| 6,469,722 | B1 | 10/2002 | Kinoe et al. | 345/837 |
| 7,234,114 | B2 * | 6/2007 | Kurtz et al. | 715/746 |
| 7,346,855 | B2 * | 3/2008 | Hellyar et al. | 715/783 |
| 7,661,075 | B2 * | 2/2010 | Lahdesmaki | 715/841 |
| 7,681,128 | B2 * | 3/2010 | Yamamoto et al. | 715/717 |
| 8,042,062 | B2 * | 10/2011 | Sheldon et al. | 715/835 |
| 8,117,548 | B1 * | 2/2012 | Ragan | 715/746 |
| 8,418,080 | B2 * | 4/2013 | Sheldon et al. | 715/835 |
| 8,464,158 | B2 * | 6/2013 | Laakso et al. | 715/738 |
| 8,516,038 | B2 * | 8/2013 | Jalon et al. | 709/203 |
| 8,549,425 | B2 * | 10/2013 | Sakamoto | 715/781 |
| 8,549,434 | B2 * | 10/2013 | Ouzts et al. | 715/838 |
| 8,601,392 | B2 * | 12/2013 | Audet | 715/810 |
| 8,607,155 | B2 * | 12/2013 | Audet | 715/784 |
| 8,607,166 | B2 * | 12/2013 | Jalon et al. | 715/838 |
| 8,631,341 | B2 * | 1/2014 | Sauve et al. | 715/777 |
| 8,645,826 | B2 * | 2/2014 | Audet | 715/273 |
| 8,701,039 | B2 * | 4/2014 | Audet | 715/810 |
| 8,707,192 | B2 * | 4/2014 | Robert et al. | 715/767 |

(Continued)

OTHER PUBLICATIONS

Simpson, A; "Cruising the Microsoft Network (MSN)" in: *Windows 95 Uncut, IDG Books Worldwide, Inc.*; Ch. 21, pp. 386-402, (1995).

(Continued)

*Primary Examiner* — David Phantana Angkool
(74) *Attorney, Agent, or Firm* — Morgan, Lewis & Bockius LLP

(57) ABSTRACT

A method, apparatus, and system are provided for displaying a graphical representation of at least a portion of a file by interfacing with a graphical interface relating to the file. A request for viewing a file content is received. A window for viewing a graphical representation of at least a portion of the content of a file is provided.

18 Claims, 7 Drawing Sheets

(56) References Cited

U.S. PATENT DOCUMENTS

| | | | |
|---|---|---|---|
| 8,713,462 B2* | 4/2014 | Robert et al. | 715/767 |
| 8,732,600 B2* | 5/2014 | Robert et al. | 715/767 |
| 8,769,080 B2* | 7/2014 | Cancel et al. | 709/224 |

OTHER PUBLICATIONS

"Hack 12. Rename and Change "Unchangeable" Desktop Icons and System Objects;" Windows XP Hacks; http://proquest.safaribooksonline.com; Chp. 2, Sect. 6.

"Setting Folder Options;" Microsoft Windows XP: Visual Quickstart Guide; http://proquest.safaribooksonline.com; 7 pgs.

Gralia, Preston; "ProQuest Tech Books: Windows XP Hacks; Table of Contents;" O'Reilly Media, Inc., 2003; 4pgs. http://proquest.safaribooksonline.com.

Fehily, Chris; "Microsoft Windows XP: Visual Quickstart Guide; Table of Contents;" Peachpit Press, 2003; 6 pgs.

"Sights and Sounds: Music and Other Multimedia;" The Complete Idiot's Guide to Windows XP; Chp. 11; 3 pgs.

"A Tour of My Pictures Folder;" The Complete Idiot's Guide to Windows XP; Ch. 8; 7 pgs.

McFedries, P.; "Windows XP Everywhere: A Few Things You Need to Know;" The Complete Idiot's Guide to Windows XP; Alpha Books, 2001; 4 pgs.

Microsoft Computer Dictionary, Fifth Ed.; Microsoft Press, 2002.

Office Action dated Mar. 5, 2008; U.S. Appl. No. 11/121,490.

Final Office Action dated Oct. 14, 2008; U.S. Appl. No. 11/121,490.

Office Action dated Apr. 1, 2009; U.S. Appl. No. 11/121,490.

Final Office Action dated Nov. 10, 2009; U.S. Appl. No. 11/121,490.

Office Action Sep. 13, 2010; U.S. Appl. No. 11/121,490.

Final Office Action dated Dec. 22, 2010; U.S. Appl. No. 11/121,490.

Office Action dated Jun. 6, 2011; U.S. Appl. No. 11/121,490.

\* cited by examiner

IMAGE PREVIEW

CROSS-REFERENCE TO RELATED APPLICATION

This is a Continuation Application of U.S. application Ser. No. 11/121,490, filed May 3, 2005 now U.S. Pat. No. 8,117,548.

BACKGROUND OF THE INVENTION

1. Field of the Invention

This invention relates generally to electronic displays, and, more particularly, to a method, apparatus, and system for providing an image preview of a data set.

2. Description of the Related Art

There have been various advancements in the area of document creation, image creation and capture technology and processing them in a computer system. Image creation and capture technology includes creating images and/or documents using various applications and capturing images processed by cameras and scanners. Generally, images are created or downloaded onto a computer, such as a Macintosh® computer system, and a user may browse through the various images captured by the camera or the scanner. The images and documents are stored individually and are generally represented graphically using an icon. A user may then browse the icons and view the content of the files represented by the icons by launching applications relating to the files to view the files.

There have been many advances in the storage, display, and processing of the various files, such as documents, images, etc. State-of-the-art computer systems provide for processing a variety of types of documents, such as photographs, database documents, text documents, presentations, etc. Often, these files may be organized on a display monitor or in a folder represented by icons. A computer system may contain a large number of icons that represent various files. These files include pictures, documents, downloaded information, and presentations.

Generally, when a user views various icons displayed on a display, the content of the file represented by each icon may be not readily apparent. At times, a large number of icons may be present on a desktop or in a computer file folder. A user may have to open a number of applications to decipher which files are represented by these icons. Designers have tried to alleviate some of these problems by designing icons of different shapes, which may provide some indication as to what type of document is associated with a particular icon. However, problems still exist with this solution since a user may still not know which document or image is associated with a particular icon or what is its associated file-content. Furthermore, icons are merely graphical signatures that are tagged onto a particular file; therefore, errors may occur where an icon may not correlate to an actual file that it purports to represent. Therefore, a user opening a particular icon may discover that an entirely different document is linked to that particular icon.

Additionally, a user would need to scroll across many icons and open various applications associated with the icons in order to decipher the actual content of the file associated with the icons. This may require various steps, such as finding the appropriate icon, double clicking the icon, launching a particular application, opening a window, examining the image in the window, deciphering the content, then exiting the application and going back to a user interface to view the next icon to be examined. This task can be very cumbersome and could cause various inefficiencies when trying to find a particular document. This process is also very inefficient when going through various icons to determine which documents are represented by the respective icons. Such inefficiencies may reduce productivity and cause a loss of valuable time and effort in processing and/or viewing files.

The present invention is directed to overcoming or at least reducing one or more of the problems set forth above.

SUMMARY OF THE INVENTION

In one aspect of the present invention, a method is provided for displaying a graphical representation of at least a portion of a file. A request for viewing a file content is received. A window for viewing a graphical representation of at least a portion of the content of a file is provided.

In another aspect of the present invention, a method is provided for displaying a graphical representation of at least a portion of a file. At least one graphical interface of a file is provided. A signal relating to a pointer interfacing with the graphical interface is received. A preview window is provided for viewing a graphical representation of at least a portion of the content of the file in response to receiving the signal.

In another aspect of the present invention, a graphical interface is provided for displaying a graphical representation of at least a portion of a file. The graphical interface comprises a first module to determine an interfacing between a pointer and a graphical interface of a file; a second module to receive at least a portion of the data relating to the file based upon determining the interfacing; and a third module provide a graphical representation of the portion of the data relating to the file.

In a further aspect of the present invention, a system is provided for displaying a graphical representation of at least a portion of a file. The system comprises a display device for displaying a graphical interface relating to a file. The system also comprises a controller for determining whether a pointer has interfaced with the graphical interface. The controller is also adapted to provide an image of at least a portion of the data relating to the file based upon the pointer interfacing with the graphical interface.

In yet a further aspect of the present invention, a preview unit is provided for displaying a graphical representation of at least a portion of a file. The preview unit comprises a first module to determine an interfacing between a pointer and a graphical interface of a file. The preview unit also comprises a second module to receive at least a portion of the data relating to the file based upon determining the interfacing. The preview unit also includes a third module provide an image of the at least a portion of the data relating to the file in preview window.

In yet another aspect of the present invention, a computer readable program storage device encoded with instructions is provided for displaying a graphical representation of at least a portion of a file. The computer readable program storage device encoded with instructions that, when executed by a computer, performs a method, comprising: receiving a request for viewing a file content; and providing a window for viewing a graphical representation of at least a portion of the content of a file.

In yet another aspect of the present invention, a preview window is provided for displaying a graphical representation of at least a portion of a file. The preview window includes an image of at least a portion of a file associated with a graphical interface. The image is displayed as a result of a stimulation of the graphical interface received from an input device. The image is displayed prior to launching an application associated with the file.

In yet another aspect of the present invention, an apparatus is provided for displaying a graphical representation of at least a portion of a file. The apparatus includes means for providing at least one graphical interface of a file. The apparatus also includes means for receiving a signal relating to a pointer interfacing with the graphical interface. Additionally, the apparatus also includes means for providing a preview window for viewing a graphical representation of at least a portion of the content of the file in response to receiving the signal.

BRIEF DESCRIPTION OF THE DRAWINGS

The invention may be understood by reference to the following description taken in conjunction with the accompanying drawings, in which like reference numerals identify like elements, and in which.

Figure 1:
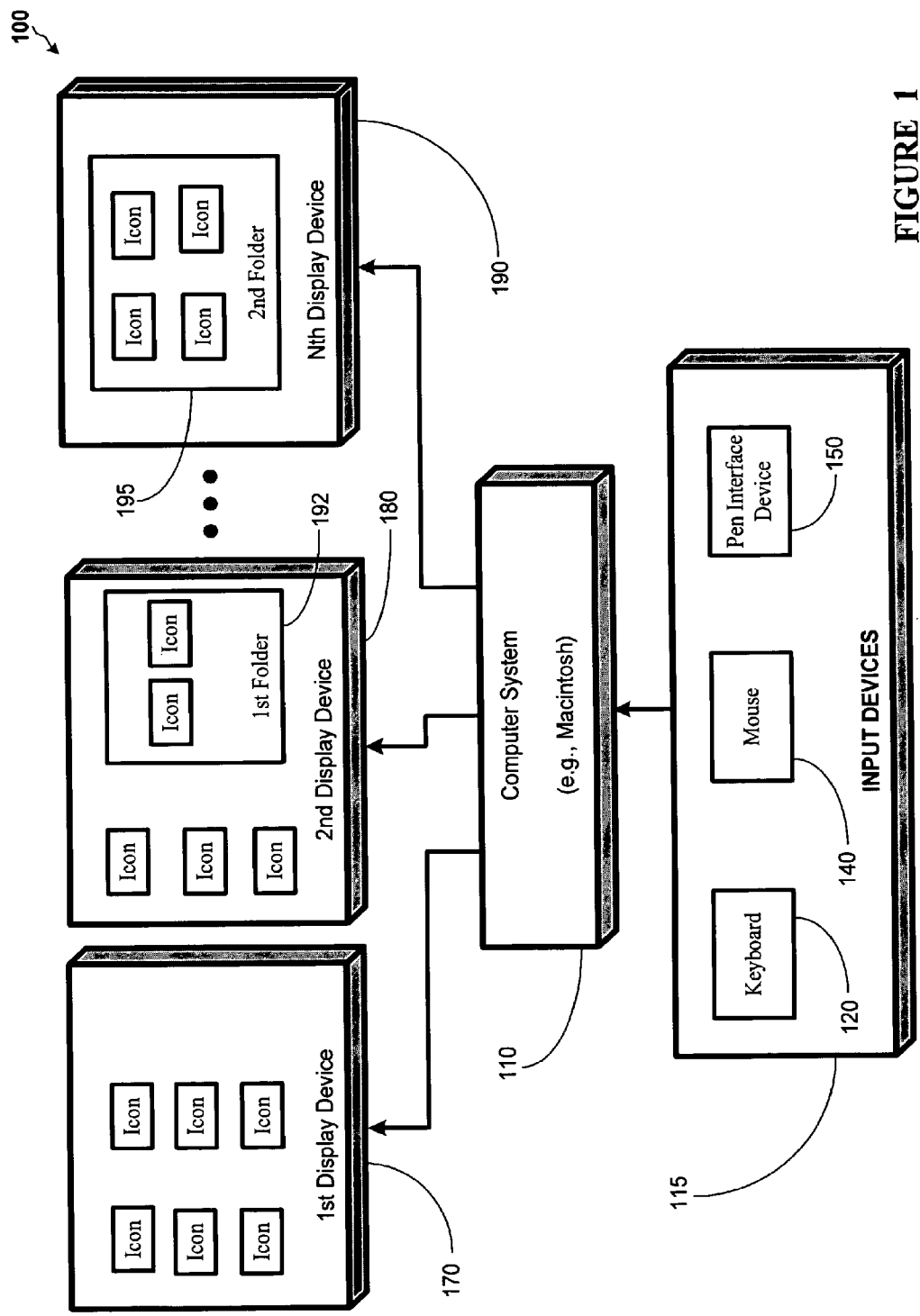
FIG. 1 provides a block diagram depiction of a system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provide for a preview window that is activated by an input device. The preview window may correspond to a graphical interface (e.g., an icon) that represents a file. For example, a pointer controlled by an input device, e.g., a mouse, may "roll" or hover over an icon (i.e., some interfacing between the pointer and the icon). This may prompt the opening of a preview location that displays at least a portion of the content of the file that is represented by the icon. Therefore, embodiments of the present invention provide for a preview location that is capable of featuring a graphical representation (e.g., a preview window) of at least a portion of a content of a file represented by a graphical object (e.g., an icon). The term "preview location" or "preview window" may relate to any region in which data can be displayed, such as a frame, a window, a display region, an icon, etc.

Embodiments of the present invention provide a method, system, and/or an apparatus for initiating the creation of a preview window upon activation of the preview window by interfacing a pointer to an icon. A user may bring the pointer into contact with an icon to activate the preview window, wherein the preview window may feature a graphical representation of at least a portion of the contents of a file associated with an icon. Embodiments of the present invention may also be used to initiate the preview window based upon an input from a keyboard, or any external device. A user may then preview a number of icons in an efficient manner without having to execute an application associated with a particular file. For example, a graphical representation of a drawing in a drawing file may be displayed in a preview window without opening or launching the drawing application that was used to create the drawing file.

Turning now to FIG. 1, a block diagram depiction of a system, in accordance with one embodiment of the present invention, is illustrated. The system 100 comprises a computer system 110 that may be coupled to one or more of a plurality of input devices 115. Based upon the input devices 115, the computer system 110 provides control of one or more tasks. Display output relating to these tasks provided by the computer system 110 may be displayed on a $1^{st}$ display device 170, or a $2^{nd}$ display device 180, or on an $N^{th}$ display device 190 (where N is any integer).

The interface devices 115 may refer to one or more data input devices, such as a keyboard 120, a mouse 140, and/or a pen interface device 150. In an alternative embodiment, the mouse 140 may be a trackball device. One or more of the $1^{st}$ through $N^{th}$ displays 170-190 may display a pointer or a cursor associated with an input device 115. The pointer or cursor may be configured to move across the various portions of the $1^{st}$ through $N^{th}$ display devices 170-190. The pointer/cursor is controlled by the computer system 110, which prompts the cursor to react to the input provided by one or more of the input devices 115.

The display devices 170-180 may be any type of device capable of displaying graphics, such as computer display monitor (e.g., a cathode ray tube [CRT] monitor, a flat panel monitor, a digital television set, etc.). The computer system 110 may be a desktop computer or server, such as an Apple Macintosh®, a classic Apple Mac®, a Power Mac G4®, a Power Mac G5®, an iMac®, an IBM compatible personal computer (PC), and the like. Further, these desktop computers, such as the Apple Macintosh®, may be coupled via a variety of networks (e.g., a local area network [LAN]), e.g., a sub-LAN, with the LAN being coupled to the Internet. In an alternative embodiment, the computer system 110 may be a portable device, such as an Apple PowerBook® or iBook®.

A user operating upon the system 100 may find that the $1^{st}$ display device 170 may illustrate a number of icons on the desktop. The $2^{nd}$ display device 180 may display a number of icons on the desktop along with a $1^{st}$ folder 192 that comprises additional icons. An $N^{th}$ display device 190 may comprise a second folder 195, which may display a variety of icons. A user operating the system 100 may find it very cumbersome to investigate the content of the various icons illustrated on FIG. 1. This task is made even more cumbersome by the fact that many systems now use a plurality of display devices where a particular user may be interested in the content of various icons on any one of the display devices 170-190.

Embodiments of the present invention provide for the capability to illustrate a display window that provides a preview of at least a portion of a content of the file that is represented by an icon when activated by the user. For example, the user may roll a mouse pointer over a particular icon in the $1^{st}$ folder 192 in the $2^{nd}$ display device 180, which may comprise a number of photos. Rolling a pointer over the icon may be inclusive of a number of action that indicates a desire by the user to view a preview region. This action may include a verbal input, a pointer input, a keystroke input, or any by of input that may be recognized by the system 100. Utilizing the embodiments of the present invention, a preview of the photos may be quickly provided without the activation of a photo program or application, such as Photoshop®. In one embodiment, the preview window of substantially any one of the icons shown in FIG. 1 may be activated by any one of the input devices 115. Therefore, a keyboard 120 may be used to activate the preview window of a particular icon, similar to the pointer controlled by a mouse 140 or a pen interface device 150. In an alternative embodiment, the preview window or region may be encompassed within an icon. In other words, the preview data may be displayed within an icon. Additionally, in one embodiment, the preview region or preview window may relate to a dedicated preview region on the display devices 170-180. Furthermore, in one embodiment, a device may enter a preview mode, where a balloon-style display region, which points to an icon being queried, may display the preview data. Further, in one embodiment, the display region may be a reduced representation of the data relating to the icon, such as a thumbnail display. In an alternative, embodiment, the preview region (e.g., the preview window, thumbnail, etc.) may be configured to accept an input (e.g., a double clicking of the mouse 140 being recognized as a request for opening an application associated the data represented by the icon.

In one embodiment, a portion of an icon may be configured such that contact from a cursor/pointer upon that region may trigger preview display of that image. Additionally, embodiments of the present invention may be configured such that the system 100 may determine if a cursor/pointer has rolled ever an icon for a predetermined period of time. Based upon this determination, the preview display may be configured. For example, the longer a person hovers over the icon, the more information that is displayed, or vice versa.

Figure 2:
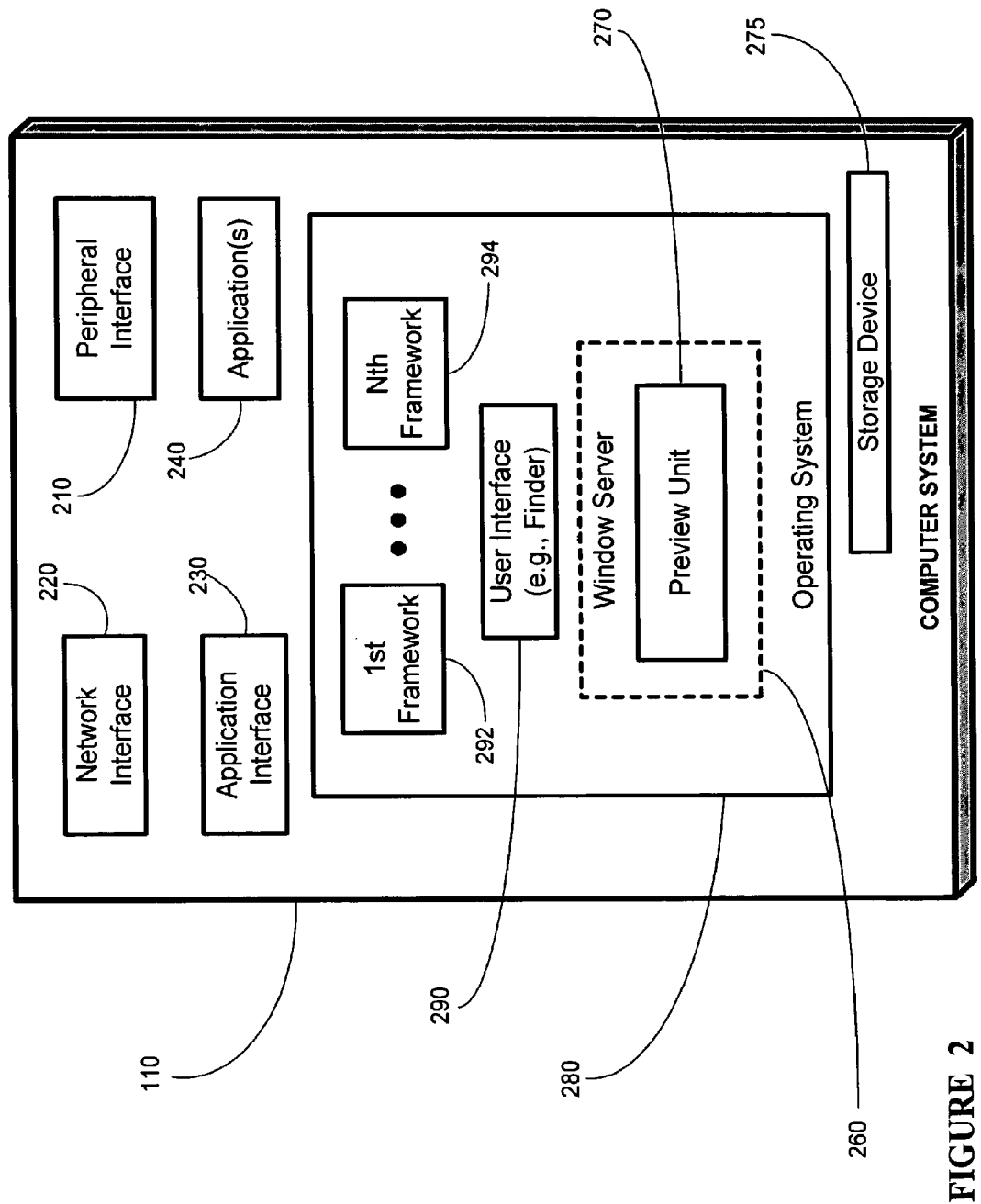
FIG. 2 illustrates a block diagram depiction of a more detailed block diagram depiction of a computer system of FIG. 1, in accordance with one embodiment of the present invention.

Turning now to FIG. 2, a more detailed block diagram depiction of the computer system 110, in accordance with one embodiment of the present invention, is illustrated. In one embodiment, the computer system 110 may comprise a peripheral interface 210, a network interface 220, an application interface 230, and one or more applications 240 that may be executed by the computer system 110. The computer system 110 also comprises an operating system 280 that is capable of controlling various operations of the computer system 110. The operating system 280 may be one of the OS-10® family of operating systems, provided by Apple Computer, Inc.

The peripheral interface 210 is capable of facilitating communications with the various peripheral devices, such as the input devices 115 illustrated in FIG. 1. The peripheral devices may include the input devices 115 and the $1^{st}$ through $N^{th}$ displays 170-190. The peripheral interface 210 may comprise various software, hardware, and/or firmware objects that are capable of interfacing with various peripheral devices interfaced with the computer system 110.

The network interface 220 allows for interaction of the computer system 110 with various other computer systems and/or other devices. The network interface 220 is capable of receiving and sending transmission requests and facilitating network communications. The application interface 230 is capable of facilitating communications between the operating system 250, various peripheral devices, and applications 240 that may reside on the computer system 106.

The operating system 280 may comprise a window server 260 that is capable of controlling the operation of various window groups and cursors/pointers displayed by the computer system 110. The window server 260 may be used by the computer system 110 to highlight various window groups associated with a particular document application 240 executed by the computer system 110. In one embodiment, the window server 260 may comprise a preview unit 270. The preview unit 270 may be a software unit, a firmware unit, a hardware unit, or any combination thereof, that is capable of directing the operation of the preview window. The software unit may be a standalone unit, such as a separate application, a routine, etc. In one embodiment, the preview unit 270 may be a graphics interface.

The preview unit 270 provides for implementing a preview window that is capable of illustrating at least a portion of the content of a file associated with a particular graphical object, such as an icon. The file may be a text document, a drawing image, a photograph image, a database document, a presentation document, or any other type of computer file. In one embodiment, the preview unit 270 may be a part of the window server 260. However, alternative embodiments may provide for the preview unit 270 to be outside of the window server 260 but within the operating system 280. And yet, in another alternative embodiment, the preview unit 270 may reside outside the operating system 280. A more detailed illustration of the preview unit 270 is provided in FIG. 3 and accompanying description below.

Continuing referring to FIG. 2, the operating system 280 may also comprise a user interface 290. The user interface 290 may be an object that is capable of providing a visual representation of files that are organized on a storage device 275 in the computer system 110. The user interface 290 may provide a graphical representation of a corresponding file that is stored in the storage device 275. Generally, the user interface 290 provides icons that represent the various files stored in the storage device 275. As an example, the user interface 290 may be a Finder® application offered by Apple Computer, Inc.

The operating system 290 may also comprise a $1^{st}$ framework 292, through an $N^{th}$ framework 294. These frameworks 292-294 may be applications that may comprise libraries that are part of the computer system 110. In other words, in one embodiment, the frameworks 292-294 may be applications that are native to the computer system 110. The preview unit 270 is capable of accessing the resources of the $1^{st}$ through $N^{th}$ framework 292, in order to generate a preview window based upon a pointer rolling over, or coming into contact with, a particular icon. A more detailed illustration of various exemplary frameworks is provided in FIG. 4 and accompanying description below.

Figure 3:
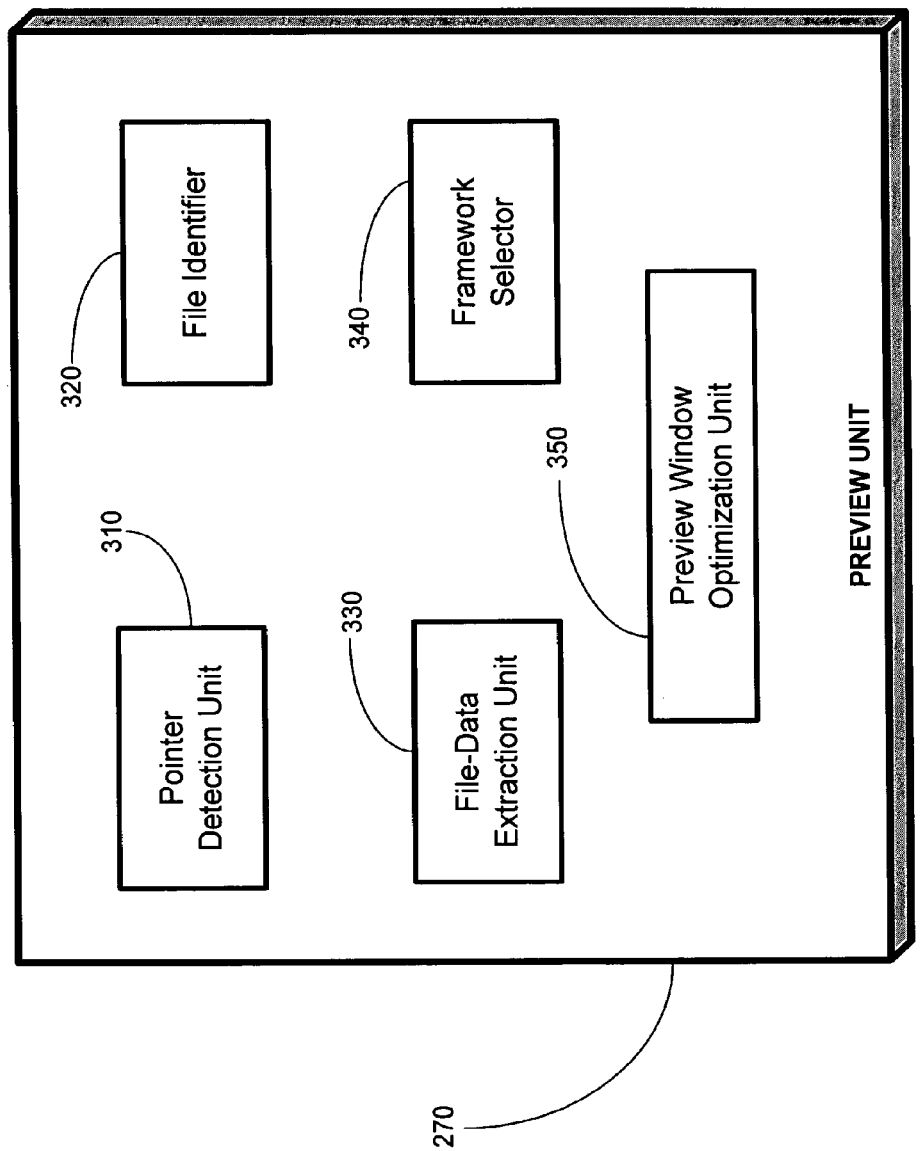
FIG. 3 illustrates a more detailed block diagram depiction of a preview unit of FIG. 2, in accordance with one embodiment of the present invention

Turning now to FIG. 3, a more detailed block diagram depiction of the preview unit 270, in accordance with one embodiment of the present invention is illustrated. The preview unit 270 may comprise a plurality of modules, such as a pointer detection unit 310, a file identifier 320, a file data extraction unit 330, a framework selector 340, and a preview window optimization unit 350. The various modules illustrated in FIG. 3 may comprise software modules, hardware modules, firmware modules, or any combination thereof.

The pointer detection unit 310 is capable of detecting a pointer, such as a mouse pointer that engages its "hot spot" upon a predetermined vicinity of a particular icon. The term "hot spot" may refer to an active area of the pointer. The pointer detection unit 310 is capable of detecting when a particular icon is stimulated by a pointer, which may represent a request for a preview window. This stimulation may include one or more of various inputs from an input device 115. The stimulation may include the hot spot of the a mouse pointer remaining atop the icon for a predetermined period of time, and input from an application, an input from a keyboard or other input device, and/or any combination thereof. Based upon the detection of the pointer over an icon, the file identifier 320 is capable of detecting the type of file that is linked to the particular icon, which the pointer has activated. The file identifier 320, for example, may determine that the pointer over a particular icon is pointed to a JPEG ("*.jpg") file. Based upon the identified file type, the framework selector 340 may select one or more of the $1^{st}$ through $N^{th}$ frameworks 292-294 in order to generate and display a preview window. In order to perform a display of a preview window, the preview unit 270 uses the file data extraction unit 330 to extract at least a portion of the data in the file that is linked to the particular icon which the pointer has activated.

Using the data from the particular file, as well as the resources of the $1^{st}$ through $N^{th}$ frameworks 292-294, the preview window optimization unit 350 may determine an appropriate preview window size. In order to determine a preview window size, the preview window optimization unit 350 may consider various factors. These factors may include, but are not limited to, the native size of the image in the file, the resolution of a particular display device 170, the placement of the window, and/or any other factors that may influence the quality and/or size of the preview display. Regarding the size of the window, the larger the amount of data that is available for resolution of an image, the bigger the potential size of the preview window, and vice versa.

The preview window optimization unit 350 is also capable of initiating the preview window and displaying the window for a predetermined time period. In an alternative embodiment, the preview window is maintained active until an active assertion by the user or an application is provided to dismiss the preview window. This active assertion may include one or more of various predetermined steps, such as the activation of a certain key on the keyboard, e.g., the "ESC" key, tapping the space bar, moving the mouse to a different location, etc. Additionally, the preview window optimization unit 350 may provide the ability for the user to manipulate the image provided by the preview window, such as zooming in or zooming out. This may be performed by utilizing one of a number of inputs provided by the external unit 150. This may include a mouse that comprises a roll wheel that may be used to increase or decrease the zoom of an image in the preview window.

Figure 4:
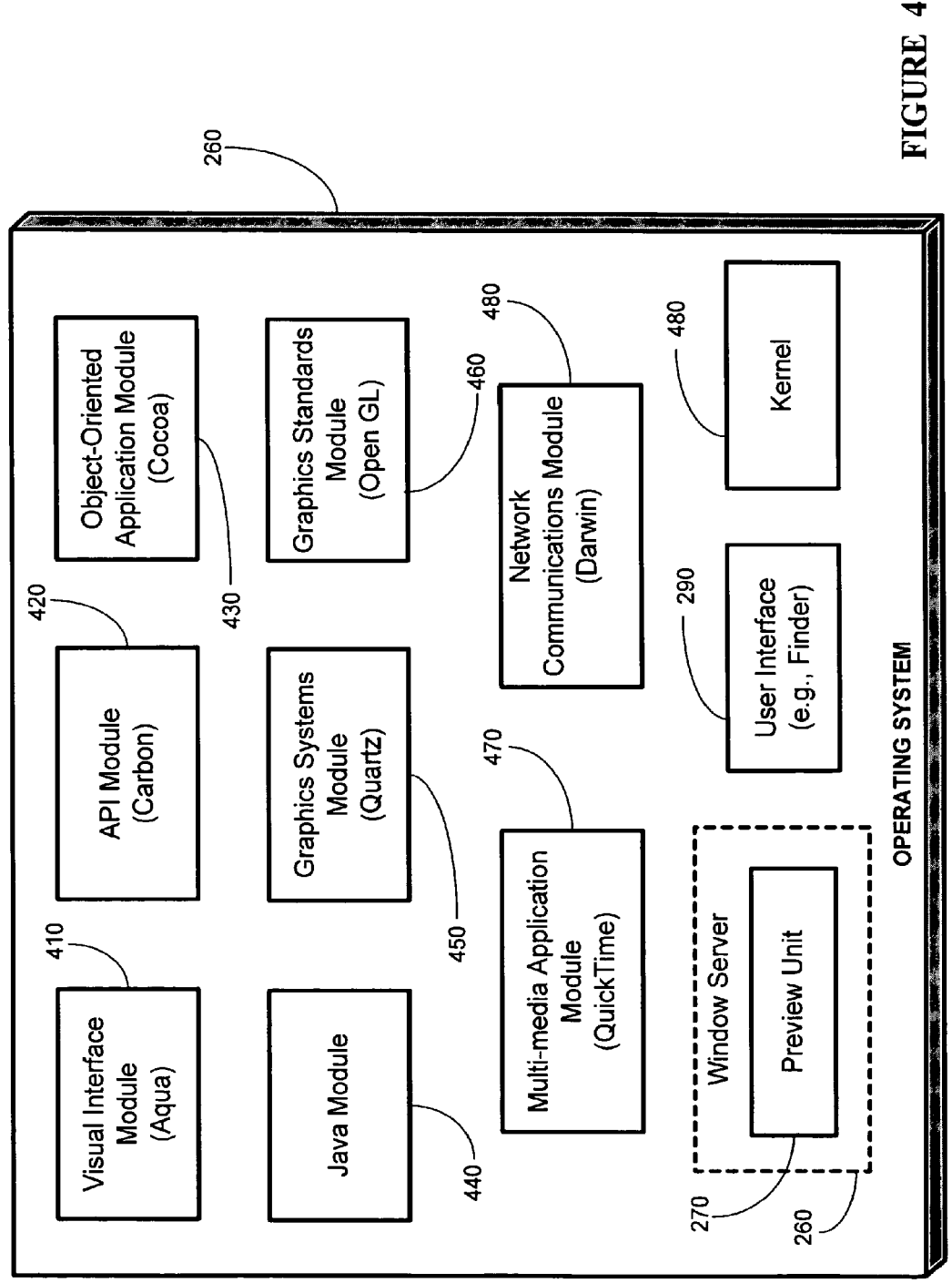
FIG. 4 illustrates a more detailed block diagram depiction of an operating system of FIG. 2, in accordance with one embodiment of the present invention.

Turning now to FIG. 4, a more detailed block diagram depiction of the operating system 260, in accordance with one illustrative embodiment of the present invention is provided. More particularly, FIG. 4 illustrates a number of exemplary frameworks that may be native to the computer system 110, although non-native frameworks may also be utilized by embodiments of the present invention for displaying a preview window. In addition to the window server 260 and the user interface 290, the operating system 280 may also comprise a kernel 480. In one embodiment, the kernel 480 may be a software, hardware and/or a firmware object that may be responsible for providing access to various peripheral devices and/or other hardware associated with the computer system 110. The kernel 480 may provide various services required by the operating system 260, the applications 240, and/or various portions of the computer system 110, or associated peripheral devices, such as the input devices 115.

Those skilled in the art would appreciate that the illustration in FIG. 4 is an exemplary operating system and that the concepts provided by embodiments of the present invention may be implemented into various types of operating systems. FIG. 4 illustrates various exemplary frameworks that may be native to the computer system 110. The various modules/frameworks 410-480 illustrated in FIG. 4 may be used by various developers to generate user interfaces for various applications. For example, the operating system 280 may comprise a visual user interface 410 (such as Aqua™ offered by Apple Computer, Inc.) that provides for a visible expression of the various functions that may be performed by the operating system 280. Aqua 410 provides for visual interactive capability to implement various interactions to various software applications. A particular software application graphical user interface (GUI) may be accessed by Aqua 410.

The operating system 280 may comprise an application protocol interface module 420 (such as the Carbon™ module offered by Apple Computer, Inc.) that provides a set of application protocol interfaces (API) that access various functions of the operating system 280. The Carbon™ module 420 allows for applications, such as multi-processing support applications, to develop Aqua™ user interfaces. Developers of languages, such as C, C++, Fortran, and other languages, may use the Carbon™ module 420 to create various operating system 280 applications. Therefore, a developer may use various features of the Carbon module 420 to develop various documents or NIB files for user interface purposes.

The operating system 280 may also comprise an object-oriented application environment module 430 (such as the COCOA™ module offered by Apple Computer, Inc.). the object-oriented application environment module 430 may provide for an object-oriented application environment that may be used for native applications associated with the operating system 280. The COCOA™ module 430 provides for supporting development of various applications. A multiple set of classes is associated with the COCOA™ module 430 to allow for development of various operating system applications. Therefore, a developer may utilize various features of the COCOA module 430 to generate various NIB files or documents, which may comprise several window groups.

The operating system 280 may also comprise a JAVA™ module 440 associated with the operating system 280. The JAVA™ module 440 allows for the development and execution of various JAVA™ programs known to those skilled in the art to be executed on the operating system 280. Developers may use the JAVA™ module 440 to generate various documents or NIB files, which may comprise a plurality of associated window groups.

The operating system 280 may also comprise a graphics system module 450, such as the Quartz™ module offered by Apple Computer, Inc. The graphics system module 450 may allow graphic systems to be implemented by developers. For example, the Quartz™ module 450 may provide for two-dimensional drawing engines and windowing environment that supports various graphic capabilities. These graphic capabilities may include device-independent color and pixel depth, remote display, layered composition and buffered windows. Therefore, a developer may utilize the Quartz™ module 450 to develop various documents that may comprise a plurality of associated window groups.

The operating system 280 may also comprise a graphic standards module 460, such as the Open GL™ module offered by Apple Computers, Inc . . . . The graphic standards module 460 may be used for developing code for generating visual effects. The Open GL™ module 460 may be utilized for generating various applications, such as games, animation, computer aided design (CAD) tools, medical imaging, and/or other applications that may require visualizing shapes in two-dimensional and/or three-dimensional environments. Developers may use the Open GL™ module 460 to develop various documents for interfacing with various graphical applications.

The operating system 280 may also comprise a multimedia applications module 470, such as the QuickTime™ module offered by Apple Computer, Inc. The QuickTime™ module 470 may provide multi-media application technology for conditioning multi-media data, such as video, sound animation, graphics, text, music, and/or virtual reality data. The QuickTime™ module 470 may provide for developing applications for allowing streaming of data, such as live or stored digital video. Developers may use the QuickTime™ module 470 to develop various documents that interface with various multi-media applications. These documents may comprise various window groups associated with particular documents. The activation and deactivation of the documents may occur based upon a variety of inputs into the computer system 106, such as an input signal from a peripheral device, such as a mouse, an audio command, and the like.

The operating system 280 may also comprise a network communication module 480, such as the Darwin™ module offered by Apple Computer, Inc. The network communication module 480 may provides for developing applications for network communication capabilities for the operating system 280. Various applications may be developed using the Darwin™ module 480 to develop network communications, support applications for multiple integrated file systems, downloading dynamic device drivers, network extensions and/or other non-native file systems. Developers may utilize the Darwin™ module 480 to develop various network documents to provide user interface for various networking applications.

Using one or more of the various framework examples illustrated in FIG. 4, in conjunction with file-content data, etc., the preview unit 270 may provide a preview window that is optimized based upon various attributes of a particular file associated with an icon. These preview windows may be generated by simply using the file content data and framework examples, and without launching the application related to file associated with a graphical representation (e.g., and icon). Utilizing the techniques described herein, the preview unit 270 may provide a preview window as exemplified in FIG. 5.

Figure 5:
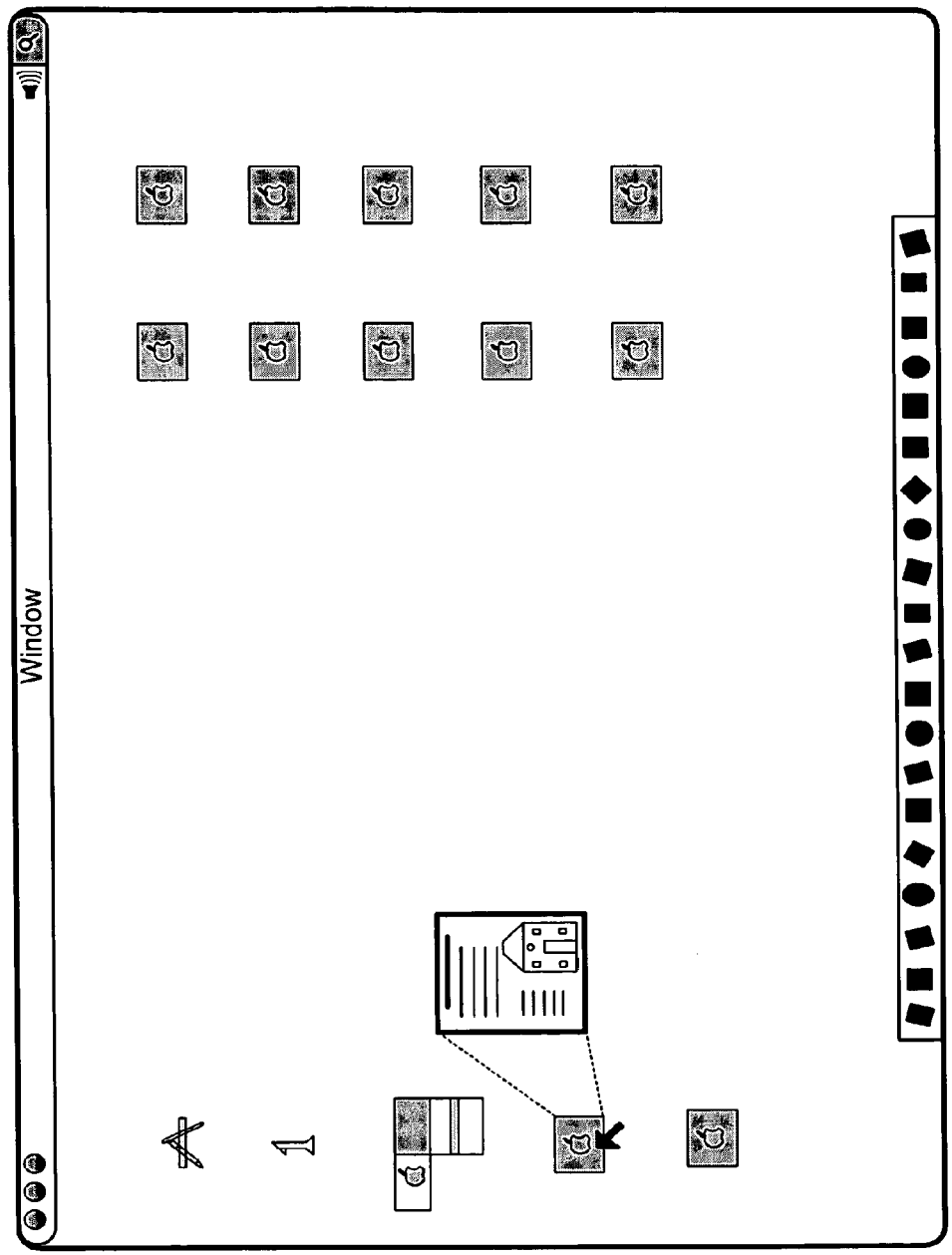
FIG. 5 illustrates a stylized depiction of a window illustrating a rollover feature in accordance with one embodiment of the present invention.

FIG. 5 illustrates an exemplary stylized screen sample associated with the computer system 110. The screen output of FIG. 5 illustrates a number of icons that may be associated with a file. A mouse pointer that is rolling its "hot spot" over the icon illustrated in FIG. 5 may initiate a preview window, as illustrated in FIG. 5. The preview window may extract at least a portion of the data in the file associated with a particular icon upon which the mouse is placed, to provide the preview window that graphically illustrates at least a portion of the file. This preview may be performed without initiating the application that is associated with the file. The window illustrated in FIG. 4 is an exemplary depiction of a mouse pointer rolling over an icon in order to initiate the display of a preview window. Using the preview window provided by embodiments of the present invention, a user may quickly decipher the content of the file associated with each of the icons residing on the screen illustrated in FIG. 5.

Figure 6:
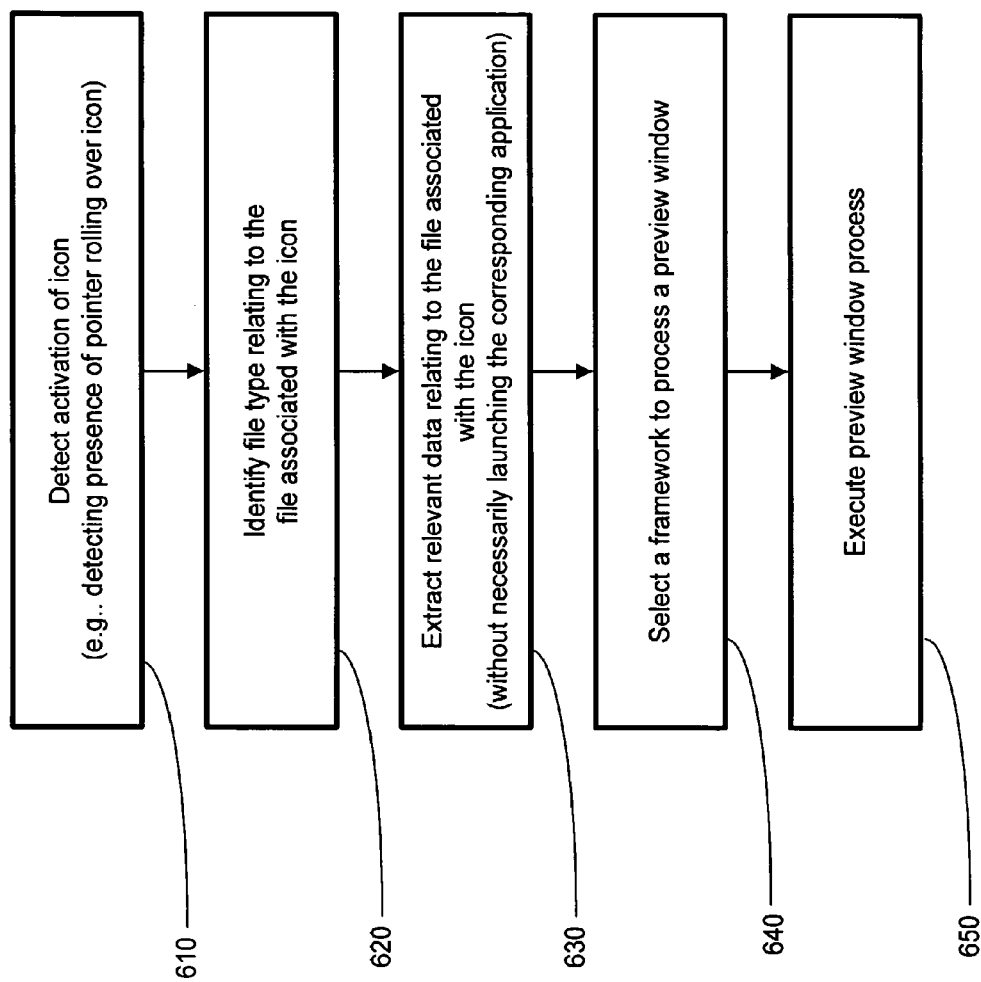
FIG. 6 illustrates a flowchart depiction of a method in accordance with one embodiment of the present invention.

Turning now to FIG. 6, a flowchart depiction of a method, in accordance with an illustrative embodiment of the present invention, is provided. Various aspects of the system 100, for example the preview unit 270, are capable of detecting the activation of an icon, indicating that a preview window for that icon is desired (block 610). This may include detecting the presence of a mouse pointer rolling over a particular icon. This may also include using a pointer that is controlled by a keyboard, a pen interface device 150, touch screen input, or any other external input devices 150. Upon detection of the activation of an icon, the preview unit 270 may identify the file type relating to the file associated with the particular icon (block 620).

The preview unit 270 may identify the type of file, such as a bit map file, a *.jpg file, a text file, or any other type of file, that is linked to a particular icon. Additionally, the preview unit 270 may extract relevant data relating to the file associated with the icon (block 630). This may include extracting data that may already be in cache memory due to the various operations performed by the operating system 280. In one embodiment, the extraction of relevant data may be performed without necessarily launching the corresponding applications that are associated with a particular file. For example, the application Photoshop® may not be activated when the preview unit 270 extracts data relating to the photo associated with an icon for generating a preview window.

The preview window 270 may then select a framework existing in the computer system 110 to process the preview window. One or more of the framework described above may be used in conjunction with the relevant data from the file, relevant data from the cache, and/or data from any other memory portion of the computer system 110 in order to execute a preview window process (block 650). The preview window process provides a preview window of at least a portion of the content of a particular file by rolling a pointer on or substantially proximate an icon. A more detailed illustration and description of the steps for executing the preview window process is provided in FIG. 7 and accompanying description below.

Figure 7:
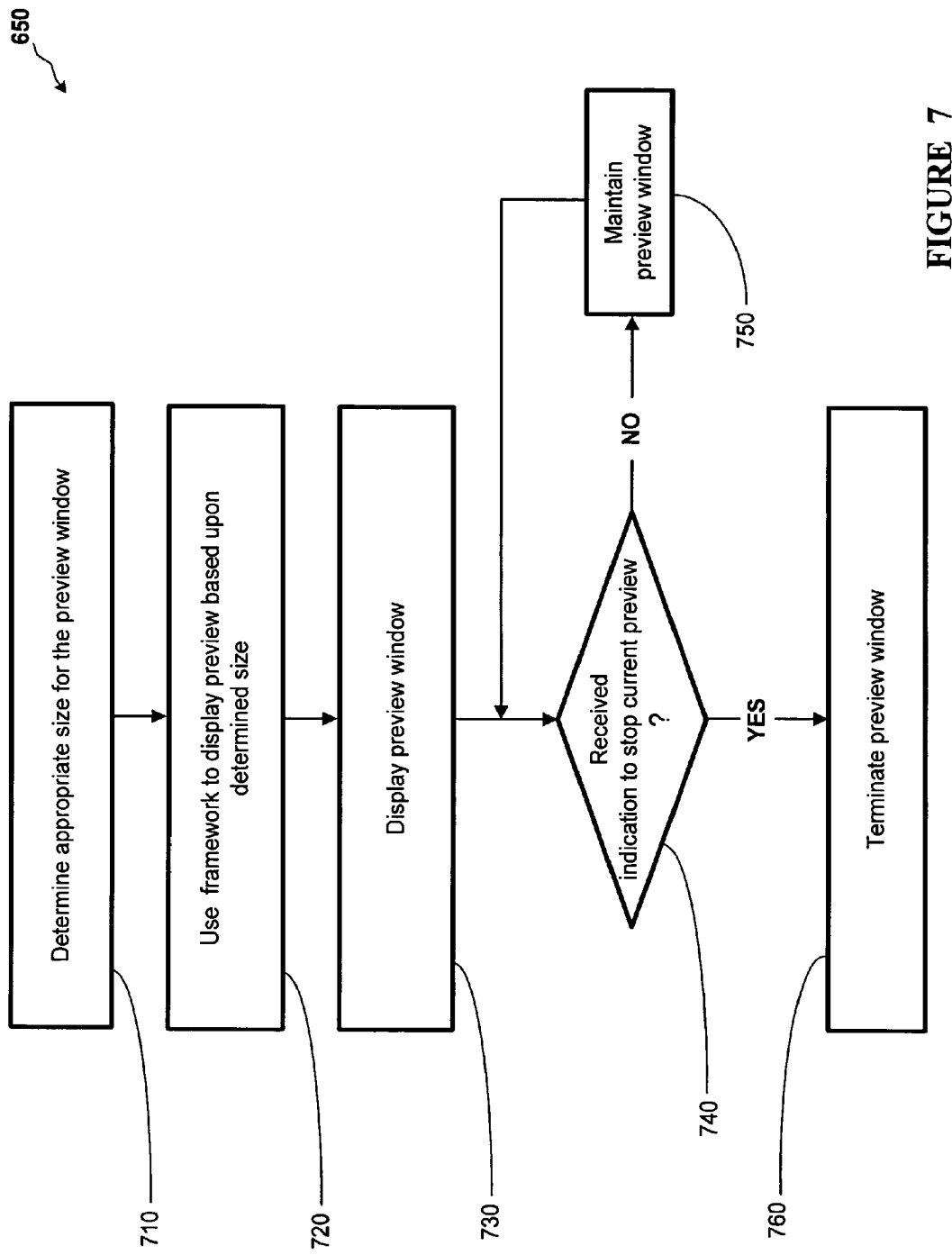
FIG. 7 illustrates a more detailed flowchart depiction of the steps for executing a preview window process of FIG. 5, in accordance with one embodiment of the present invention.

Turning now to FIG. 7, a more detailed exemplary flowchart depiction of the steps associated with executing the preview window process of block 650 in FIG. 6 is illustrated. The preview window 270 may determine the appropriate size of the preview window (block 710). This may be determined by examining various factors, such as the native size of the image associated with a particular icon being activated, the resolution of the monitor, the placement of a window, and/or other factors that may influence the quality of the image displayed in the preview window (block 720). Upon determination of the appropriate size for the preview window 270, one or more portions of the framework, along with data acquired from the file and/or other portions of the computer system 110, may be used to display a preview of the file content, or at least a portion thereof, in a preview window (block 730).

A determination is then made as to whether an indication to stop the current preview has been received (block 740). Upon a determination that the indication to stop the current preview has not been received, the preview window is maintained and the process is looped back to block 740 (block 750). Therefore, the preview window is maintained until an indication to stop the current preview is received. The indication may be received from a particular user, an application, or as a result of a predetermined time-out. The predetermined time-out may be based upon a pre-conceived maximum time for displaying a preview window that is programmed into the computer system 110. Upon an indication to stop the current preview, the preview unit 270 terminates the preview window (block 760). This termination may include the shutting down of a preview window when the mouse cursor illustrated in FIG. 4 rolls away from the icon. In this case, the preview window disappears and if the mouse rolls to another icon, a new preview window relating to that particular icon may then be generated.

Utilizing embodiments of the present invention, users may readily decipher at least a portion of the content of a file associated with a particular icon without having to launch an application associated with the file. This provides for an efficient means of checking the files associated with a number of icons that may be displayed in a folder or on a desktop of the computer system 110. Additionally, searching for a particular document may be made easier by allowing the user to quickly decipher the proximate contents of a particular file when searching several icons. Therefore, efficiency in determining the content of a file without actually running the application associated with a file provides for more efficient and productive utilization of a user's time. The embodiments of the present invention may be implemented into a variety of computer systems, control systems, etc., and still remain within the spirit and scope of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design shown herein, other than as described in the claims below. It is, therefore, evident that the particular embodiments disclosed above may be altered or modified and all such variations are considered within the scope and spirit of the invention. Accordingly, the protection sought herein is as set forth in the claims below.

What is claimed:

1. A method, comprising:
    receiving a request for previewing content of a file, wherein the file has a file type other than a file folder; and
    responsive to receiving the request, providing a preview for viewing a graphical representation of at least a portion of the content of the file, wherein providing the preview further comprises:
        in accordance with a determination that a first amount of file content is available for the preview, displaying a first appearance for the preview that graphically represents the first amount of file content; and
        in accordance with a determination that a second amount of file content is available for the preview, displaying a second appearance for the preview that graphically represents the second amount of file content, wherein the first amount of file content is different from the second amount of file content and the first appearance is different from the second appearance.

2. The method of claim 1, wherein receiving said request for previewing said content of the file further comprises receiving a signal relating to a pointer interfacing with a graphic interface relating to said file.

3. The method of claim 2, wherein receiving said request for previewing said content of the file further comprises detecting a mouse pointer rolling over an icon relating to said file.

4. The method of claim 1, wherein providing said preview for viewing a graphical representation of at least a portion of the content of said file further comprises displaying an image of said at least a portion of said content of said file in a preview window using at least one native framework.

5. The method of claim 1, wherein providing said preview for viewing a graphical representation of at least a portion of the content of said file further comprises displaying an image of said at least a portion of said content of said file without using an application relating to said file.

6. The method of claim 1, wherein providing said preview for viewing a graphical representation of at least a portion of the content of said file further comprises providing a window for displaying a content relating to said preview.

7. A system, comprising:
    one or more processors; and
    memory having instructions stored thereon, the instructions, when executed by the one or more processors, cause the processors to perform operations comprising:
        receiving a request for previewing content of a file, wherein the file has a file type other than a file folder; and
        responsive to receiving the request, providing a preview for viewing a graphical representation of at least a portion of the content of the file, wherein providing the preview further comprises:
            in accordance with a determination that a first amount of file content is available for the preview, displaying a first appearance for the preview that graphically represents the first amount of file content; and
            in accordance with a determination that a second amount of file content is available for the preview, displaying a second appearance for the preview that graphically represents the second amount of file content, wherein the first amount of file content is different from the second amount of file content and the first appearance is different from the second appearance.

8. The system of claim 7, wherein receiving said request for previewing said content of the file further comprises receiving a signal relating to a pointer interfacing with a graphic interface relating to said file.

9. The system of claim 8, wherein receiving said request for previewing said content of the file further comprises detecting a mouse pointer rolling over an icon relating to said file.

10. The system of claim 7, wherein providing said preview for viewing a graphical representation of at least a portion of the content of said file further comprises displaying an image of said at least a portion of said content of said file in a preview window using at least one native framework.

11. The system of claim 7, wherein providing said preview for viewing a graphical representation of at least a portion of the content of said file further comprises displaying an image of said at least a portion of said content of said file without using an application relating to said file.

12. The system of claim 7, wherein providing said preview for viewing a graphical representation of at least a portion of the content of said file further comprises providing a window for displaying a content relating to said preview.

13. A non-transitory computer readable program storage medium encoded with instructions that, when executed by one or more processors, performs a method, comprising:
    receiving a request for previewing content of a file, wherein the file has a file type other than a file folder; and
    responsive to receiving the request, providing a preview for viewing a graphical representation of at least a portion of the content of the file, wherein providing the preview further comprises:

in accordance with a determination that a first amount of file content is available for the preview, displaying a first appearance for the preview that graphically represents the first amount of file content; and in accordance with a determination that a second amount of file content is available for the preview, displaying a second appearance for the preview that graphically represents the second amount of file content, wherein the first amount of file content is different from the second amount of file content and the first appearance is different from the second appearance.

14. The computer readable program storage medium of claim 13, wherein receiving said request for previewing said content of the file further comprises receiving a signal relating to a pointer interfacing with a graphic interface of said file.

15. The computer readable program storage medium of claim 14, wherein receiving said request for previewing said content of the file further comprises detecting a mouse pointer rolling over an icon relating to said file.

16. The computer readable program storage medium of claim 13, wherein providing said preview for viewing a graphical representation of at least a portion of the content of said file further comprises displaying an image of said at least a portion of said content of said file in a preview window using at least one native framework.

17. The computer readable program storage medium of claim 13, wherein providing said preview for viewing a graphical representation of at least a portion of the content of said file further comprises displaying an image of said at least a portion of said content of said file without using an application relating to said file.

18. The computer readable program storage medium of claim 13, wherein providing said preview for viewing a graphical representation of at least a portion of the content of said file further comprises providing a window for displaying a content relating to said preview.

* * * * *